Aug. 12, 1924.  
H. A. HOKE  
LUBRICATING DEVICE FOR CROSSHEAD PINS  
Filed Dec. 13, 1922  
1,504,349
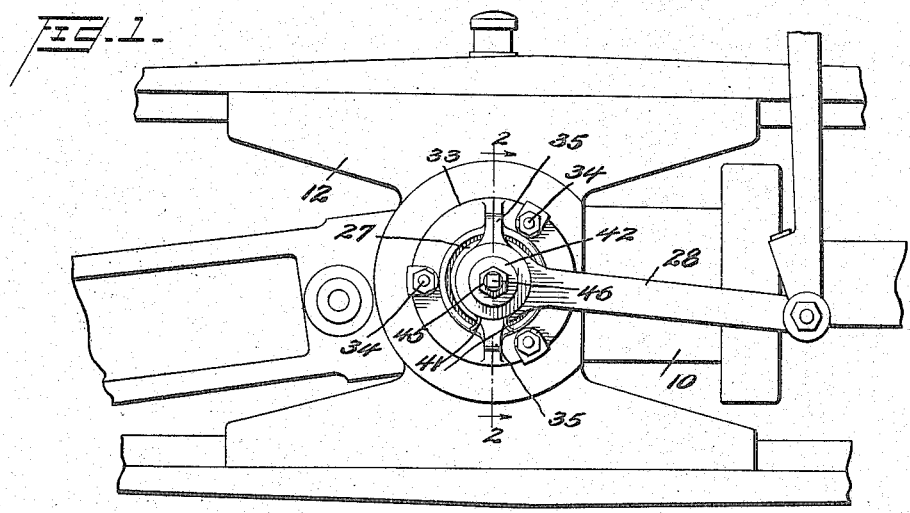
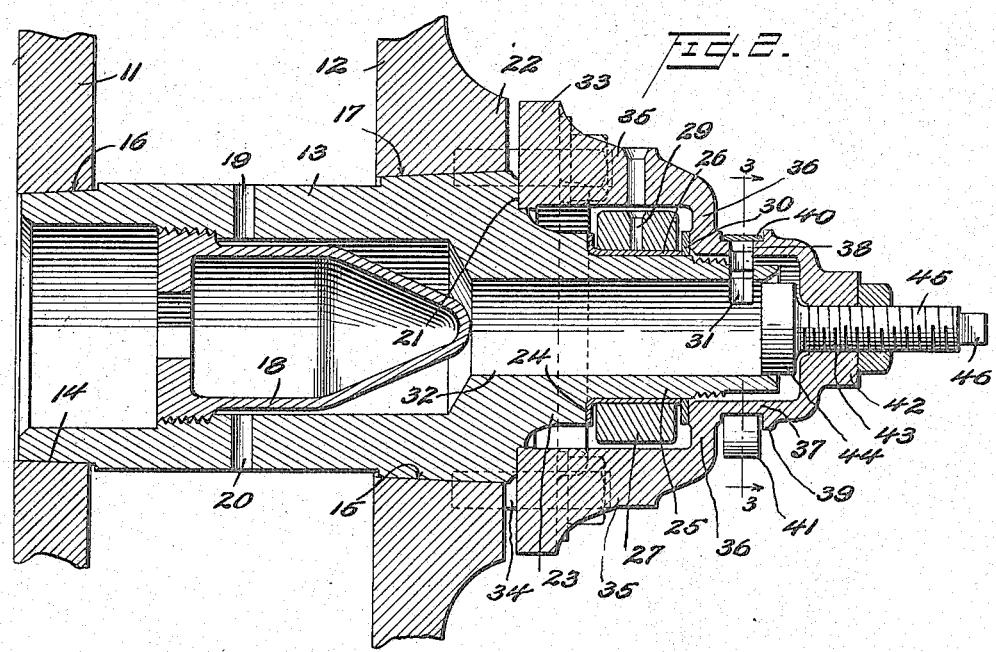
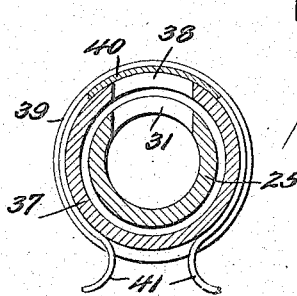
Inventor
H. A. Hoke,
By Watson, Coit, Morse & Grindle,
Attorneys Patented Aug. 12, 1924.

1,504,349

UNITED STATES PATENT OFFICE.

HARRY A. HOKE, OF ALTOONA, PENNSYLVANIA.

LUBRICATING DEVICE FOR CROSSHEAD PINS.

Application filed December 13, 1922. Serial No. 606,713.

*To all whom it may concern:*

Be it known that I, HARRY A. HOKE, a citizen of the United States, and resident of Altoona, county of Blair, and State of Pennsylvania, have invented certain new and useful Improvements in Lubricating Devices for Crosshead Pins, of which the following is a specification.

This invention relates to hollow metal pins having relatively stationary supports at its ends and an intermediate cylindrical bearing surface with a small opening through it to the interior such as the wrist pins used on the cross heads of locomotives and other large engines and in the main and side rod bearings. It relates particularly to a structural arrangement for easily and effectively causing a lubricant to enter said bearing pin or rod on the outer side of its support and move inward to said opening thus lubricating the bearing surface. Structural arrangements for this purpose have been used in the prior art, one being shown in my Patent No. 1,312,987, August 12, 1919, but these prior devices had defects and objectionable features which it is the object of the present invention to avoid. In those devices the pin or rod to be lubricated usually had an extension from one end provided with a cylindrical screw threaded bore and the lubricant was inserted in the open outer end of said bore and a screw threaded plunger or piston engaging the threads of the bore was utilized to force the lubricant inward. The grease used as a lubricant is quite hard having a consistency corresponding approximately to that of Ivory soap and it is in the form of comparatively thin circular cakes about one-half inch in thickness and of the desired diameter to fit the particular bore but after they have been passed along the bore of the extension and compressed in the pin or rod they will become soft by reason of the heat developed by the friction due to the running of the engine and will pass out through the openings and lubricate the bearing surface. It was found however in practice that there was a tendency on the part of enginemen and others having charge to fill the bore or cup for the lubricant completely with the disks of lubricant and this in view of the hardness of the material made it difficult to make the threads of the piston or plunger properly engage the threads of the bore or cup for the purpose of compressing the grease and forcing it inwardly and those attempting to operate the device would frequently use a hammer to force the plunger or piston inward far enough to engage the threads. The result of this was often to so damage the threads as to make them useless and necessitate the substitution of a new pin or rod and this was of course quite expensive.

The present invention provides a structural combination composed of a very few, easily assembled parts in which the plunger or piston for forcing the lubricant inwardly of the bore of the pin has a screw threaded operating rod connected to it on its outer side which at all times is in full mesh with a nut held in relatively stationary position beyond the end of the pin and extending materially beyond that screw threaded nut. The outer surface of the plunger is smooth and cylindrical and the inner surface of the bore or cup which receives the grease is also smooth and cylindrical and therefore the plunger may easily enter it from the end and move along it with no trouble about engaging threads. The cakes of lubricant in a device embodying the present invention furthermore are supplied laterally to the bore on the side of the plunger next to the cross head and while the plunger is in position in the outer end of the bore the cakes being admitted through a lateral slot. It will thus be seen that the lubricant can be easily supplied to the device without disconnecting any part, by simply revolving a cover plate for the slot and that it can be forced into the pin and to its bearing surfaces by simply turning the screw threaded rod connected to the plunger without any danger of injuring threads or any other part of the device. The novel features of the invention will be more fully understood from the following description and claims taken with the accompanying drawing. In the drawings:

Figure 1 is a side elevation of a cross head having thereon a wrist pin embodying the present invention.

Figure 2 is a section on the line 2—2 of Figure 1, and,

Figure 3 is a section on the line 3—3 of Figure 2.

As shown in Figure 1 the cross head embodies the usual piston rod receiving sleeve 10 and the inner and outer vertical walls 11 and 12. The upper and lower edges of these walls have bearing surfaces for longitudinal movement as is well known. The wrist pin 13 is substantially cylindrical between the walls 11 and 12 but has surfaces 14 and 15 at its ends which taper slightly from the outer side inward and which respectively fit in correspondingly tapered sockets 16 and 17 in walls 11 and 12. The wrist pin is hollow and the interior of that part between the walls 11 and 12 has the same structural arrangement as those in common use including the hollow casting 18 to occupy a part of the space but having a passageway for lubricant between it and the inner wall of the pin to the radial openings 19 and 20 to the bearing surface. The wrist pin has an integral hollow extension for a material distance beyond the side of the outer wall 12 but this extension is of materially reduced diameter. There is an outer ring like section 21 in a radial plane close to the outer surface of the circular projecting ring 22 formed on the outer face of wall 12 around the opening in which the pin fits the outer face of this projection 22 being also in a radial plane. From the shoulder 21 outwardly the outer diameter of the extension 23 from the end of the wrist pin is of reduced diameter on longitudinally curved lines and this is followed by a further reduction forming a shoulder 24 and a cylindrical portion 25. This cylindrical portion 25 may have on it a bearing sleeve 26 for the end bearing ring 27 of the cross head link 28 and this bearing sleeve has in it a passageway 29 for lubricant. A radially arranged bearing washer 30 is preferably placed on the outer side of the ring 27. Near the end of the wrist pin extension 23 there is a transverse slot 31 which is of sufficient width to receive one of the circular cakes of lubricating material heretofore mentioned and which has a length transversely slightly less than the diameter of the cylindrical bore 32 of the extension 23 as will be seen from Figure 3. It will be noted that the bore of the extension 23 is smooth from the outer end to the inner end.

An integral cap member is adapted to surround the extension from the end of the wrist pin and it includes a ring portion 33 with its faces in radial planes and which is adapted at the inner edge portion of its outer face to fit the shoulder 21 on the wrist pin and it extends outwardly peripherally some distance beyond the outer surface of the pin. It has openings in it at intervals through which screw threaded bolts 34 connect it to the outer wall 12 in its projecting portion 22 and it will be noticed that by this arrangement the wrist pin will be securely held in its inward position and will be adjusted by adjusting the bolts. A pair of integral arms 35 opposite each other extend longitudinally of the wrist pin having their inner surfaces as far from the axis as the inner surface of the end ring 33 but having end portions 36 turned inwardly and reduced in thickness and size integrally joining a cylindrical cap 37 which has an interior diameter only slightly greater than the outer diameter of the end of the extension 23. The inner end of this cap 37 fits against the bearing washer 30 and there is a transverse slot 38 through it immediately over the slot 31 and corresponding in length and width with that slot. A small integral rib 39 extends around this cap near the outer edge of the slot and a semi-circular thin spring strip 40 with out-turned ends 41 may fit over the slot 38 acting as a closure in one position and its spring action will hold it in place but it can be easily revolved when necessary to fill the device with lubricant.

The outer end of the cap 37 has an integral collar 42 of materially less diameter extending outwardly and having a screw threaded cylindrical opening 43. A plunger or piston 44 closely fits the inner surface of the cylindrical bore 32 of the pin extension and has rigidly connected to its outer side a rod 45 which is screw threaded and which operatively engages the screw threads in the bore 43 of collar 42 so that by turning this rod the plunger will move inwardly or outwardly along the bore 32 and may occupy a position at either side of the slot 31. It is normally partly within the bore. The outer end 46 of the rod 45 is made square or of some other form in section adapted to be engaged by a wrench or hand tool for turning.

It will be understood from the above description that cakes of grease may be very easily placed in the bore 32 and moved inwardly by the plunger until the device is full with no danger of breaking threads or any other part. Although one specific embodiment of the invention is shown for purposes of illustration it will be understood that it is not limited to the details shown beyond what is called for in the claims.

Having thus described the invention what is claimed as new and desired to be secured by Letters Patent is:

1. In a lubricating device of the class described the combination with a cross head pin having a longitudinal extension from one end of reduced diameter externally and internally, the bore being smooth and cylindrical and having a transverse slot-like opening near its end, a cap provided with a cylindrical bore surrounding said end and slot and having a corresponding slot therein, means for holding said cap and extension rigidly in fixed relations, the bore of said cap beyond the end of said extension being of much smaller diameter and screw threaded, a piston in the cylindrical bore of said extension adapted to occupy a position on either side of its slot, a screw threaded rod on said piston passing through and in threaded engagement with the outer bore of said cap and a material distance beyond it so shaped at its outer end as to be adapted to be engaged for turning.

2. In a lubricating device of the class described the combination with a cross head pin having a longitudinal extension from one end of reduced diameter externally and internally, the bore being smooth and cylindrical and having a transverse slot-like opening near its end, a piston fitting said cylindrical bore on either side of said slot and having a screw threaded rod secured thereto and projecting centrally therefrom and so formed at its outer end as to be adapted to be engaged for turning, a cap having a screw threaded opening beyond the end of said extension through which said screw threaded rod passes in engagement and means for holding said cap and extension rigidly in fixed relations when adjusted for use.

3. In a lubricating device of the class described the combination with a cross head pin having a longitudinal extension from one end of reduced diameter externally and internally, the bore being smooth and cylindrical and having a transverse slot-like opening near its end, a cap provided with a cylindrical bore surrounding said end and slot and having a corresponding slot therein, means adapted to rigidly connect said cap to the cross head wall adjacent said pin and exert longitudinal pressure inward on said pin to center it, the bore of said cap beyond the end of said extension being of much smaller diameter and screw threaded, a piston in the cylindrical bore of said extension adapted to occupy a position on either side of its slot, a screw threaded rod on said piston passing through and in threaded engagement with the outer bore of said cap and a material distance beyond it so shaped at its outer end as to be adapted to be engaged for turning.

4. In a lubricating device of the class described the combination with a cross head pin having a longitudinal extension from one end of reduced diameter externally and internally, the bore being smooth and cylindrical and having a transverse slot-like opening near its end, a cap provided with a cylindrical bore surrounding said end and slot and having a corresponding slot therein, means for holding said cap and extension rigidly in fixed relations, the bore of said cap beyond the end of said extension being of much smaller diameter and screw threaded, a piston in the cylindrical bore of said extension adapted to occupy a position on either side of its slot, a screw threaded rod on said piston passing through and in threaded engagement with the outer bore of said cap and a material distance beyond it so shaped at its outer end as to be adapted to be engaged for turning, a lock nut on said screw threaded rod on the outer side of said cap, and a spring strip ring like closure for said slot in said cap adapted to fit partly around it between shoulders on its outer surface.

5. In a device of the class described the combination with a cross head pin having a longitudinal extension from one end of materially reduced diameter externally forming an outwardly facing circular shoulder, and of reduced interior diameter the bore being smooth and cylindrical and having a transverse slot like opening near its outer end, an integral member partly surrounding said extension including at its inner end a ring having sides in radial planes adapted to fit and engage at its inner edge said shoulder on said pin and having bolt holes at intervals beyond the periphery of said shoulder for screw-threaded connection to the wall of the cross head adjacent the pin, two arms extending from said ring longitudinally of said extension but spaced therefrom having inturned outer ends, a cap connected to said inturned ends provided with a cylindrical bore surrounding the end portion of said pin extension and its slot and having therein a corresponding slot, the bore of said cap beyond the end of said extension being of greatly reduced diameter and screw threaded, a piston in the bore of said extension adapted to move longitudinally therein and a screw threaded rod connected to said piston extending through and in threaded engagement with the outer bore of said cap extending a material distance beyond it and so formed at its end as to be engaged for turning.

6. In a lubricating device the combination with a journal having a longitudinal extension from one end of reduced diameter and having an axial bore opening at the reduced end and communicating with the bearing surface and having a transverse slot-like opening adjacent said end for the introduction of lubricant, a cap surrounding said reduced end and slot, and having a corresponding slot registering with the first mentioned slot, a piston fitting said bore on either side of said slots having a threaded stem screwed through said cap, and means for rigidly securing said cap to said journal.

7. In a lubricating device the combination with a bearing member having a bored extension beyond its bearing surfaces, communication with said surfaces, and opening at the end of said extension and having a transverse slot-like opening adjacent said end, a piston fitting the bore of said extension on either side of said slot-like opening, and having a screw threaded rod secured thereto and projecting centrally therefrom and so formed at its outer end as to be adapted for turning, and a cap rigidly secured to said extension over the open end thereof, and having a screw threaded opening which said threaded rod engages.

In testimony whereof I hereunto affix my signature.

HARRY A. HOKE.